United States Patent [19]
Furtney et al.

[11] Patent Number: 5,257,372
[45] Date of Patent: Oct. 26, 1993

[54] METHODS FOR EFFICIENT DISTRIBUTION OF PARALLEL TASKS TO SLAVE PROCESSES IN A MULTIPROCESSING SYSTEM

[75] Inventors: Mark Furtney; Frank R. Barriuso, Both of Apple Valley; Clayton D. Andreasen, Rosemont; Timothy W. Hoel, Eagan; Suzanne L. LaCroix, Shorewood; Steven P. Reinhardt, Eagan, all of Minn.

[73] Assignee: Cray Research, Inc., Eagan, Minn.

[21] Appl. No.: 630,301

[22] Filed: Dec. 19, 1990

[51] Int. Cl.⁵ .......................... G06F 9/00; G06F 9/38; G06F 9/46
[52] U.S. Cl. .......................... 395/650; 364/DIG. 1; 364/281.0; 364/281.3; 364/281.4; 364/281.6; 364/281.7; 364/281.8
[58] Field of Search ........................................ 395/650

[56] References Cited
FOREIGN PATENT DOCUMENTS
0330836 9/1989 European Pat. Off.

OTHER PUBLICATIONS
"Parallelism Granularity Important in Control of System Efficiency," R. Masson; *Computer Technology Review*, vol. 10, No. 9, Jul. 1990, Los Angeles, Calif.

European Patent Office Search Report dated Jan. 11, 1993 (citing the three references noted above).

*Primary Examiner*—Gareth D. Shaw
*Assistant Examiner*—A. Katbab
*Attorney, Agent, or Firm*—Merchant, Gould, Smith, Edell, Welter & Schmidt

[57] ABSTRACT

Three new, efficient protocols for providing communications between a user's application program, a Multiprocessing Library, and the host Operating System is described. These new protocols are termed WAKEUP, GIVEUP, and CONTEXT-TO-USER-SPACE. They utilize the concept of a conduit through which the Operating System and the user application program can communicate without the need for expensive system calls. A primary use for the new protocols is the scheduling of multiple Central Processing Units (CPUs) into a single user program in a multi-CPU, multiprogramming, multi-tasking environment. WAKEUP allows a master process to quickly request the asynchronous scheduling of slave processes to help execute parallel tasks. GIVEUP allows a slave process time to finish a task before Operating System interruption. Once completed with its task, there is no need to save the context of the slave process. CONTEXT-TO-USE-SPACE allows other slave processes the opportunity to execute interrupted tasks that were not allowed to finish under GIVEUP.

14 Claims, 7 Drawing Sheets

METHODS FOR EFFICIENT DISTRIBUTION OF PARALLEL TASKS TO SLAVE PROCESSES IN A MULTIPROCESSING SYSTEM

FIELD OF THE INVENTION

This invention relates generally to process management in a multiprocessing, multiprogramming computer system. In particular, it is directed to communication between the host Operating System and user application programs.

BACKGROUND OF THE INVENTION

Since the advent of computing systems, a prominent goal has been to speed up program execution. On uniprocessing systems, the preferred way has been to design faster electronic components to speed electrical signals through the system. For such systems, theoretical limits, such as the speed of light, place an upper bound on the speed of program execution. To extend beyond such limitations, multiprocessing of user programs takes advantage of the processing power of several central processing units (CPUs) concurrently executing a single program.

Multiprocessing is possible when some sections of program code are independent from other sections in their order of execution. In that case, multiple CPUs may execute these sections of code concurrently. Ideally, a program would run N times faster if N CPUs were simultaneously executing the program code. However, this best case is not possible for a variety of theoretical and practical reasons.

Theoretically, a program will not achieve this maximal speed-up if there are sections of code that must be executed in a non-trivial partial ordering—e.g. some sections of code must wait for other sections to finish executing in order to use their results. These data dependencies dictate how much a given program can be sped up by having more than one CPU executing its code concurrently. They also indicate that a given program may go through sections of code that require at most one CPU and other sections where multiple CPUs may be used. This transition between single CPU mode and multiple CPU mode for a given program creates practical reasons why programs, in general, do not achieve their maximal speed-up.

One practical reason involves communication between the user program and the host Operating System. In a multiprogramming environment (i.e. several user programs simultaneously compete for computing resources) it is usually inefficient to allow one program to keep multiple CPUs attached to it when a program is in single CPU mode. These idle CPUs might better serve system throughput by working on other programs until that program returns to multiple CPU mode. When the program does, however, return to multiple CPU mode, it needs to request additional CPUs from the Operating System. In the prior art, the user program and the Operating System have historically had two avenues for communication: the system call, which is a request by the program for services, and the interrupt, which a mechanism by which the Operating System reports certain information to the user program. Neither mechanism the high-speed communication needed for efficient multi-tasking in a multiprogramming environment. Without a method of high speed communication, a computing system is far from achieving either maximal speed-up or efficient system throughput.

A problem occurs when user programs request additional CPUs to process sections of code that are sufficiently small. In the worse case, the time it takes for a single CPU to execute the entire section of code might be the same or less than the time it takes to request extra CPUs for assistance. System throughput decreases by processing these requests. Also, program execution suffers if the program slows down to request and wait for additional CPUs. As a result, exploitable parallelism must occur on a relatively coarse grain of program structure, and opportunities for multiprocessing are lost.

Another problem occurs with Operating System interrupts. If the Operating System needs to disconnect a process that is performing useful parallel work in order to connect a process that is currently of higher priority, the context of the process being disconnected must be saved. This interruption introduces two inefficiencies.

First, the saving of context is additional overhead. However, the saving and restoring of context is not necessary for some types of parallel work. For example, suppose a process, tasked to execute iterations of a Parallel DO Loop, is interrupted by the Operating System. If this interruption occurs at the end of a particular iteration, then the process would have finished its useful work and returned its results to common memory. In that case, no context needs to be saved to restart the process later.

Second, the user program may have to wait for the interrupted process to return before continuing with useful work. Generally, no work beyond the parallel region can be started until all the work in the parallel region has been completed. This is necessary to ensure program correctness. If the interrupted process has not returned to continue its work, other processes that have finished their parallel work are forced to wait.

SUMMARY OF THE INVENTION

The present invention addresses these problems by providing three protocols for high speed, asynchronous communication between the master program (i.e. the process that executes the user program), the Operating System, and a Multiprocessing Library which schedules slave processes to perform slices of parallel work, called "tasks". These protocols utilize an agreed-upon data buffer, called a "conduit," to facilitate this communication.

The first protocol, WAKEUP, allows the master process to request additional CPUs to work in parallel regions of code. The master process does not stop or slow down to request additional CPUs. The master process, detecting a parallel region, sets flags in the conduit that are associated with slave processes. The Operating System asynchronously polls these flags and awakens any sleeping slave processes. The awakened slave processes are subsequently scheduled by the Multiprocessing Library to execute parallel tasks.

The second protocol, GIVEUP, allows a slave process enough time to finish a task before the Operating System disconnects it. Instead of blindly disconnecting, the Operating System sets a flag in the conduit that the Multiprocessing Library subsequently reads as a request to return a particular CPU attached to a slave process. When the process attached to the CPU has finished its work (e.g. finished a parallel DO Loop iteration), it returns itself to the Multiprocessing Library for another task assignment. Instead of giving the process another task, the Multiprocessing Library returns the CPU to the Operating System. The slave process is put to sleep without the need to save its context.

The third protocol, CONTEXT-TO-USER-SPACE, is employed when the Operating System cannot wait for a slave process to finish a task before interruption. In that case, the context of the interrupted process is saved in user-space, instead of system space. The Operating System sets a flag in the conduit. The Multiprocessing Library later interprets the flag as a process that was interrupted during useful work. The Multiprocessing Library will assign the work of the interrupted process to the first available slave process that returns for an additional task assignment.

DESCRIPTION OF THE DRAWINGS

In the drawings, where like numerals refer to like elements throughout the several views.

DETAILED DESCRIPTION OF THE PREFERRED EMBODIMENT

In the following Detailed Description of the Preferred Embodiment, reference is made to the accompanying drawings which form a part hereof, and in which is shown by way of illustration, a specific embodiment in which the invention may be practiced. It is to be understood that other embodiments may be utilized and implementation changes may be made without departing from the scope of the present invention.

The present invention describes three separate protocols: WAKEUP, GIVEUP and CONTEXT-TO-USER-SPACE. These protocols form an integral part of the Cooperative Parallel Interface. The protocols, through the Interface, allow high speed communication between a user program and a host Operating System.

The preferred embodiment utilizes a separate Multiprocessing Library that controls the scheduling of processes that are slaves to the user program's master process. Additionally, a separate data buffer, the conduit, facilitates asynchronous communication between the user program, the Multiprocessing Library, and the host Operating System.

Figure 1:
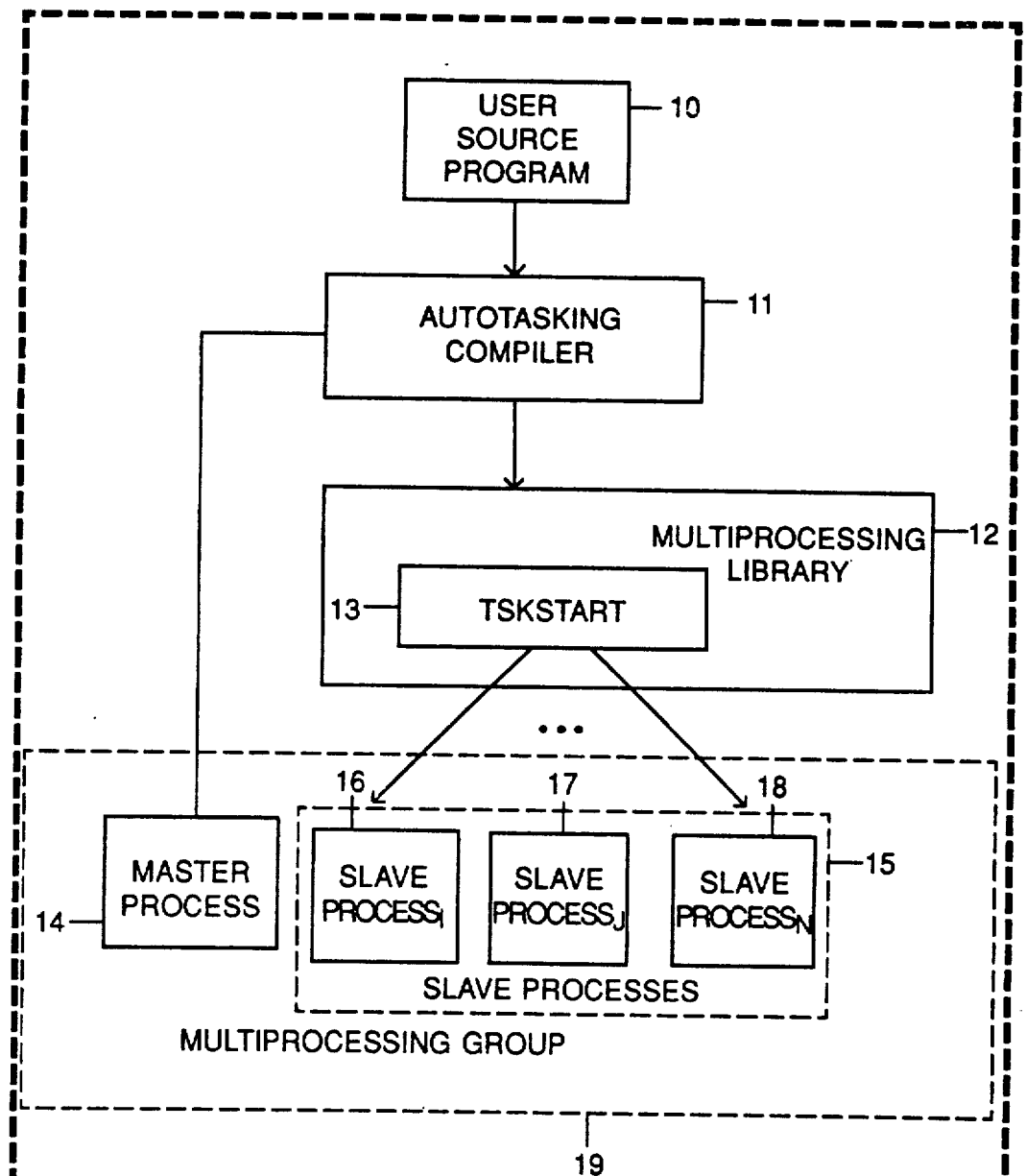
FIG. 1 is a block diagram illustrating the creation of a Multiprocessing Group.

FIG. 1 illustrates how a Multiprocessing Group is formed. Dashed line 5 represents diagrammatically a multiprocessing system within which the software and data components of the invention function. Although not shown explicitly, it shall be understood that system 5 includes a shared memory used for interprocessor communication. Although the present invention is not limited to a particular type of multiprocessing system, known systems on which it will function include the Cray X-MP and Y-MP multiprocessor systems. Descriptions of these systems are found, for example, in U.S. Pat. No. 4,636,942 issued Jan. 13, 1987, entitled "Computer Vector Multiprocessing Control"; U.S. Pat. No. 4,754,398 issued Jun. 28, 1988, entitled, "Apparatus and Method for Multiprocessor Communication"; and in U.S. application Ser. No. 308,401, filed Feb. 9, 1990, entitled "System for Multiprocessor Communication". As used herein, the term "system space" refers to the portion of memory reserved for the Operating System; "user-space" refers to that space allocated to use by user programs. The user source program 10 is preferably compiled by the automatically parallelizing compiler 11 that looks for regions of parallel processing that occur within the user source program 10. The compiler may also include mechanisms for the user to specify parallel regions manually as well as detecting parallelism automatically. The manner in which the user-program is compiled for parallel processing of tasks is not, however, part of nor essential to the present invention.

The Multiprocessing Library 12 creates all the additional processes that a user program will need at job start-up. A library routine, TSKSTART 13, uses a system call to spawn all the necessary slave processes 15. The preferred embodiment spawns one slave process for each physical CPU. It should be understood, however, that any arbitrary number of slave processes will suffice. These processes, together with master process, belong to the same Multiprocessing Group 19.

Figure 2:
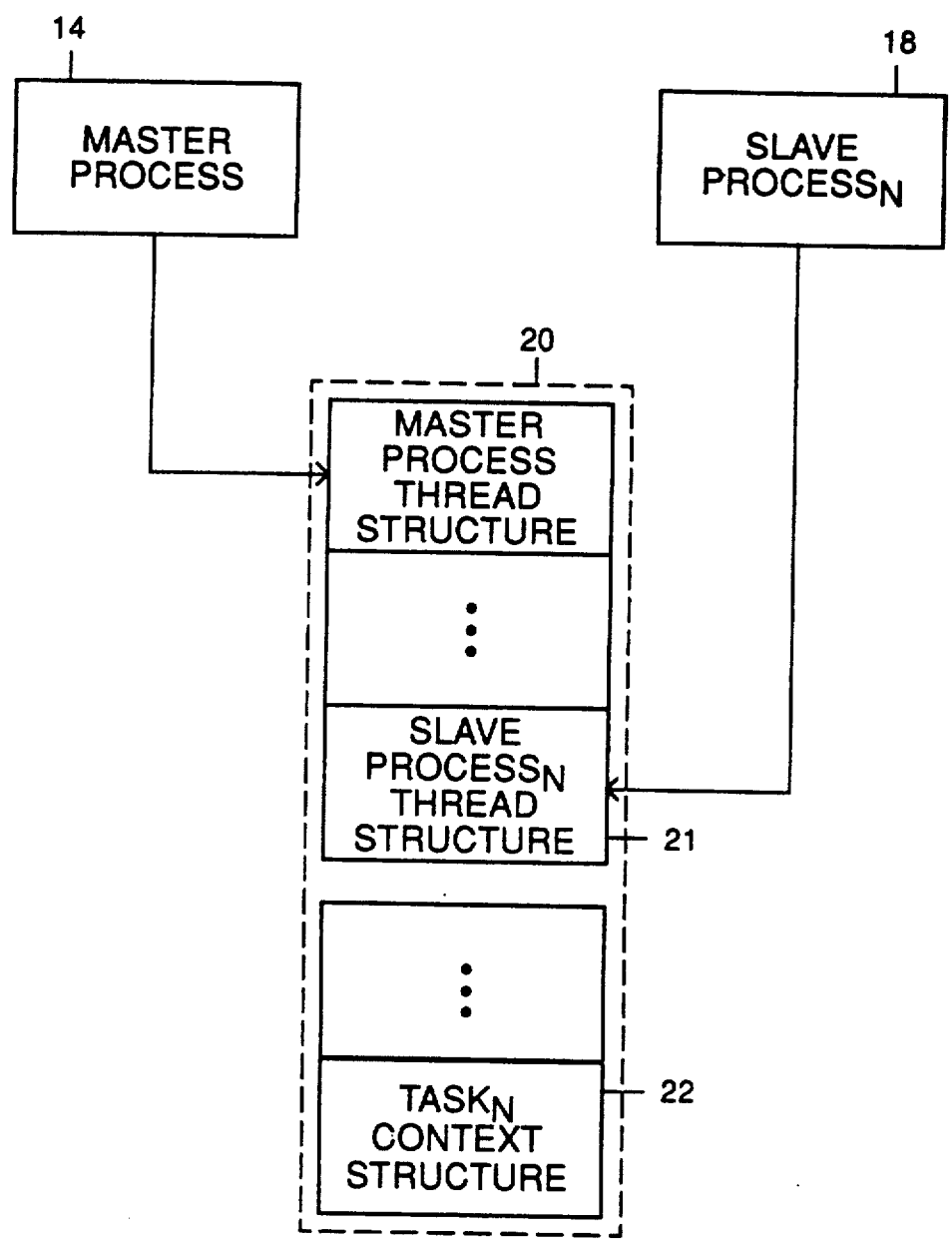
FIG. 2 shows the constituent parts of the conduit.
Figure 3:
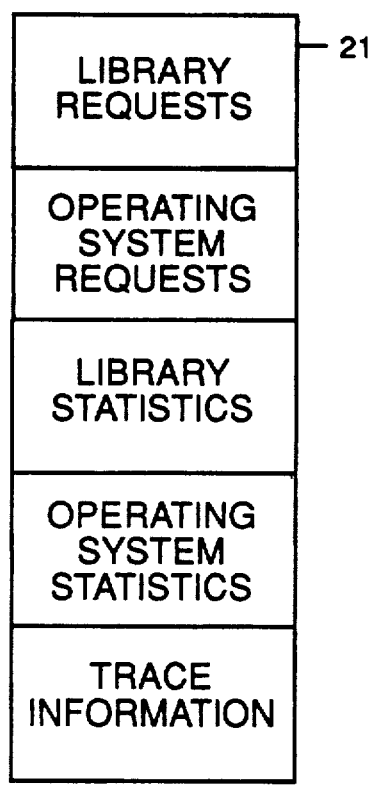
FIG. 3 shows the constituent parts of a process thread structure in the conduit.
Figure 4:
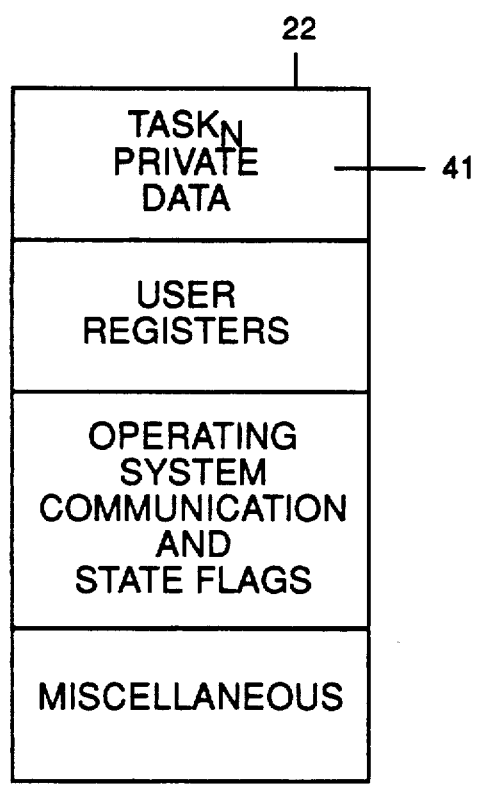
FIG. 4 shows the constituent parts of a task context structure in the conduit.

FIGS. 2–4 depict the data structures used to implement the present invention. In FIG. 2, the Multiprocessing Library 12 implements an agreed-upon data buffer, called a conduit, in user-space to facilitate communication. The conduit 20 contains individual thread structures and context structures. For example, slave process N has a thread structure labelled 21 and a task context structure labelled 22. The Multiprocessing Library 12 associates a thread structure for each individual process in the Multiprocessing Group 19 at job program start-up. The Multiprocessing Library 12 makes this association with a system call and the association persists throughout the execution of the user program.

FIG. 3 shows the constituent parts of an individual process thread structure 21. Each thread structure contains the following types of data:

Library requests and pointers
Operating System requests and pointers
Library statistics
Operating System statistics
Trace information.

Within each thread structure, there are certain flag words —the wakeup word, giveup word, and context save flag. The wakeup word is set by the master process 14. The giveup word is set by the Operating System.

At program start-up, the master process 14 begins execution in single CPU mode and continues until a parallel section of code is encountered. While the master process 14 is in single CPU mode, the slave processes 15 are in "sleep" state. When the master process 14 encounters a multiple CPU mode section, tasks (i.e. parallel work) recorded in Multiprocessing Library 12 are given to slave processes to execute. Slave processes and tasks are created at job start-up time. Processes are in a "sleep" state and tasks are "idle" until the Master Process encounters a parallel region. Each task that is created has an associated context structure 22 (FIG. 4) that is located in the conduit 20.

FIG. 4 shows the constituent parts of a task context structure. Each task contains the following types of data:

Private data storage area 41
Space to hold a full set of user registers and associated privileged registers and status words Operating System communication and state flags
Other miscellaneous task storage areas.

Apart from the task private data area 41, the task context structure 22 is reserved for use by the Multiprocessing Library 12 and the Operating System.

The conduit 20 provides the mechanism for a process-to-task scheduling paradigm. This scheduling paradigm is defined by the three major protocols of the Cooperative Parallel Interface: WAKEUP, GIVEUP, and CONTEXT-TO-USER-SPACE. It is understood that the preferred embodiment employs the above-mentioned data structures; however, other data structures may be similarly used to implement the protocols.

Figure 5:
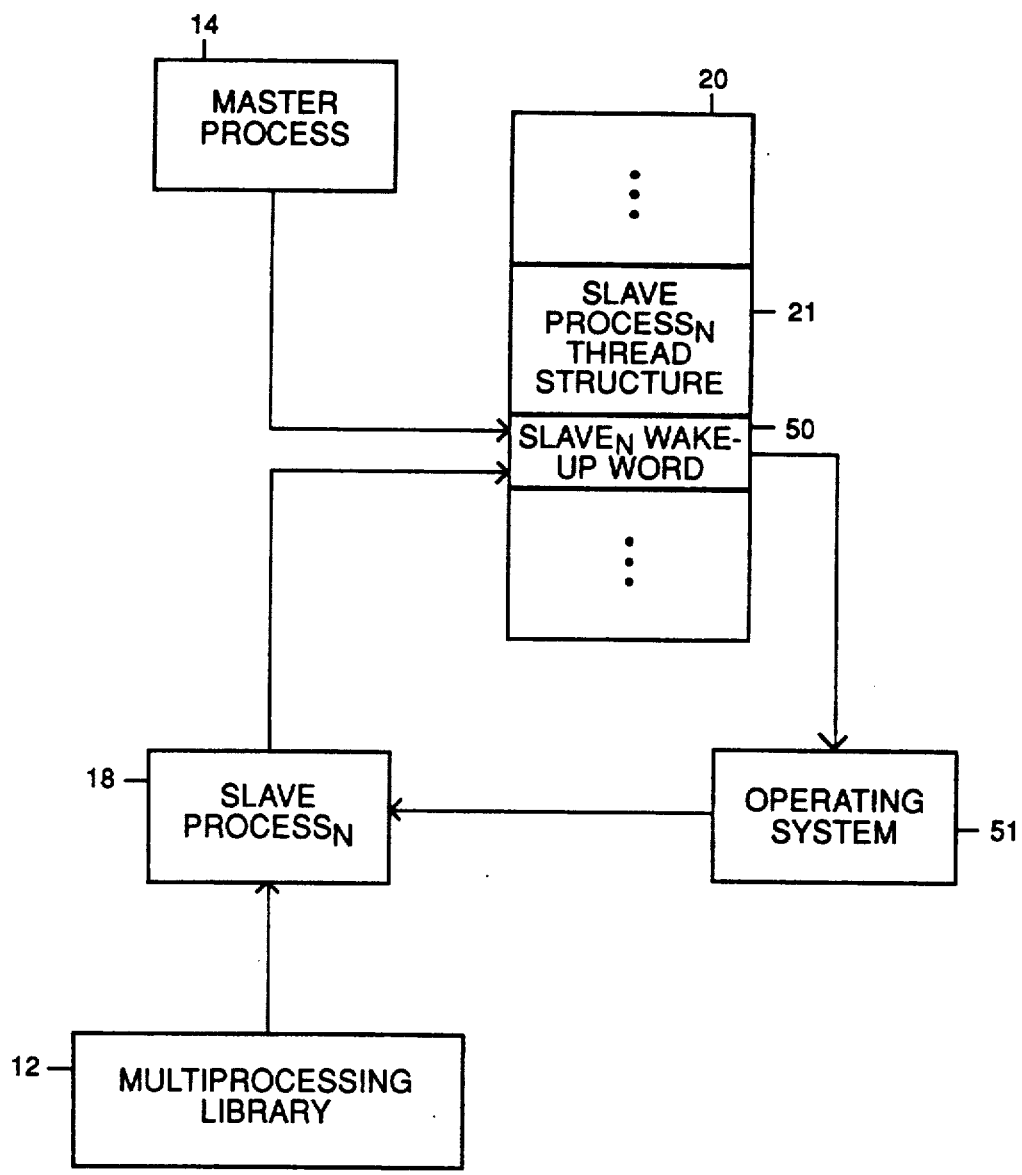
FIG. 5 illustrates the WAKEUP protocol.

FIG. 5 illustrates the WAKEUP protocol. WAKEUP addresses the problem that occurs when a master process encounters a multiple CPU region and requests additional CPUs. WAKEUP allows the master process to set flags in the conduit quickly and continue to execute the program code serially. The Operating System asynchronously reads the flags and handles the requests.

Each thread structure contains a "wakeup word" that is written by the master process and read by the Operating System. As mentioned above, when the master process 14 begins execution, it starts in single CPU mode. Slave processes that are not executing are in "sleep" state. The master task is that task which executes the serial portions of the user program. When the master process 14 encounters a multiple CPU region of code, it sets the wakeup word of every sleeping slave's thread structure to some non-zero value. As depicted in FIG. 5, slave process N 18 is sleeping and the master process 14 sets its wakeup word 50 to a non-zero value. The Operating System 51 polls the wakeup words asynchronously. Since slave N's wakeup word 50 is non-zero, slave process N 18 is "awakened" and placed in the run queue.

The newly scheduled processes begin executing in the Multiprocessing Library 12. The Multiprocessing Library 12 then schedules a task to each awakened process. At the time that the master process sets the wakeup words in the thread structures, it also writes to a word that is read by the library that indicates which contexts (or tasks) are to be scheduled to participate in the parallel work. The task is thus scheduled to participate in the parallel work. When the task has completed its portion of parallel work, the task returns to the Multiprocessing Library 12 and is placed in the "idle" state.

If the Multiprocessing Library 12 does not have another task to schedule the process, the process spin waits in user-space for a set amount of time, called the "slave hold time". The process spin waiting in the Multiprocessing Library 12 checks to see if there is a task that has been disconnected with its context stored in the conduit 20, or if there is a task that is yet to be scheduled. If so, the process will start executing the task. If there is no such task to be scheduled, the process will clear its wakeup word 50 and give up its CPU by way of a system call at the expiration of its slave hold time.

Figure 6:
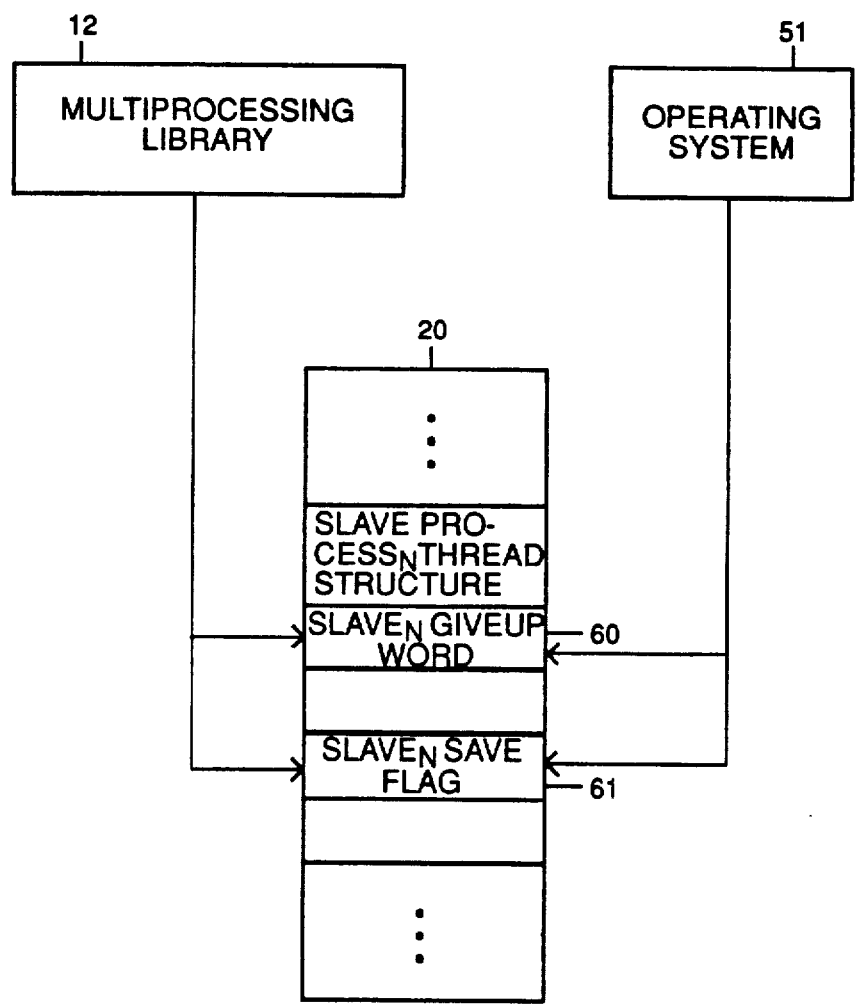
FIG. 6 illustrates the GIVEUP protocol.

FIG. 6 illustrates the GIVEUP protocol. GIVEUP avoids the problem associated with disconnecting a process in the middle of a task. GIVEUP postpones the disconnection until the task has been completed in order to minimize the number of context saves.

Each thread structure contains a "giveup word" 60 that is written by the Operating System 51 and read by the Multiprocessing Library 12. Additionally, each thread structure contains a "context save flag" 61 that is written by the Multiprocessing Library 12 and read by the Operating System 51. The context save flag has three settings: "save-in-user-space"; "save-in-system-space"; and "don't-save-at-all" if in the hold loop. Essentially, a context save flag is set to save-in-user-space if and only if the associated process is assigned a task. The first two settings tell the Operating System 51 where to save the register set for this process when it is interrupted, the last that no save is to be performed.

Before the Operating System 51 interrupts a process, it checks to see if the process has a thread structure associated with it. If it does not, then the process is disconnected. If it does, then the Operating System 51 checks to see if the context save flag is set to "save-in-user-space". If it is not, then the process is not currently doing any parallel work and may be disconnected. If it is set to save-in-user-space, then the process is currently doing parallel work. In this case, the Operating System 51 sets the giveup word 60 to a negative value indicating to that process that it should give up the CPU at its earliest convenience.

The patience of the Operating System 51 with respect to GIVEUP requests is, however, finite. If the process does not give up the CPU within a given time period, the Operating System 51 will interrupt the process. This time period is arbitrary; however, it should be large enough to allow the process to finish a reasonable task.

When the process has completed its task and returns, the multiprocessing library 12 checks its giveup word 60. If it is set to a negative value, the process immediately reschedules back to the Operating System 51. When rescheduling for a GIVEUP request, the process does not clear its wakeup word 50. This forces the Operating System to reconnect the process in order for the process to spin wait for its slave hold time period. This is different from when a process reschedules to the Operating System because its slave hold time has expired.

Figure 7:
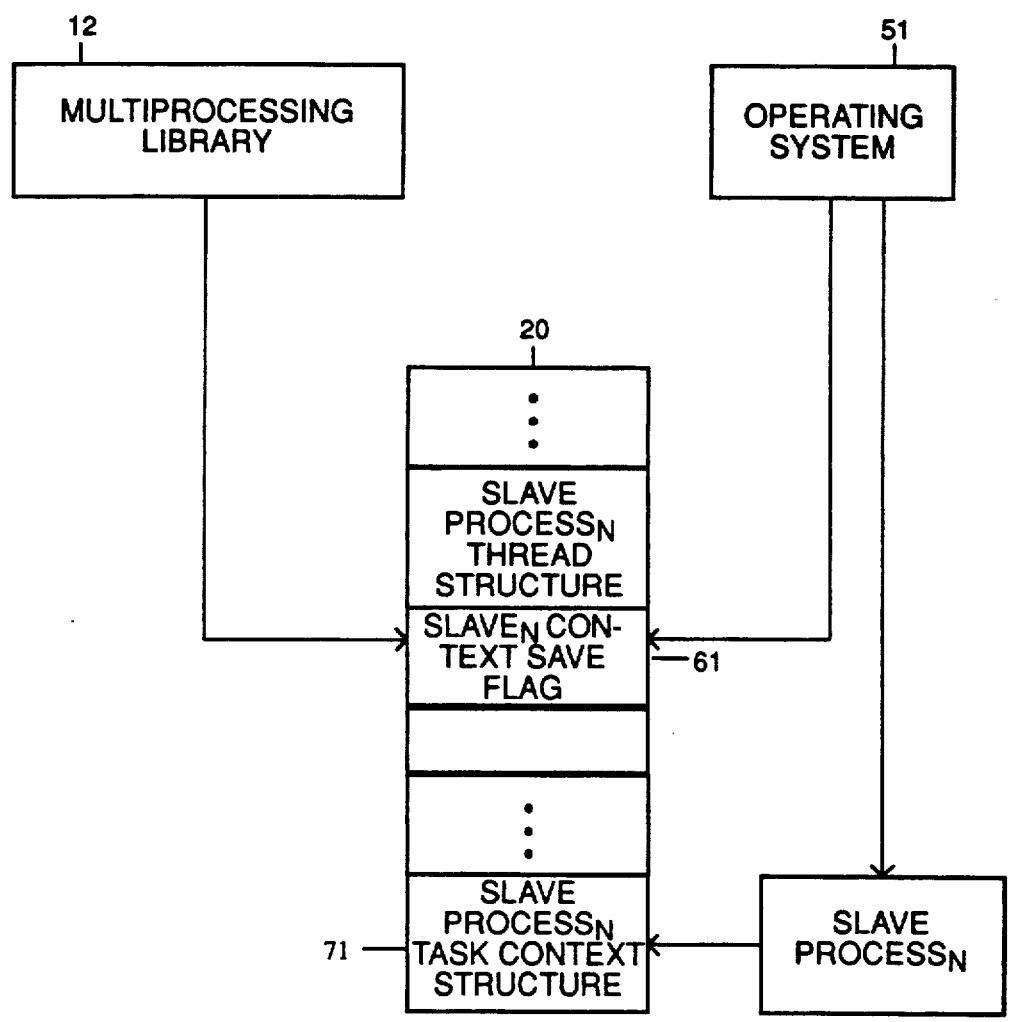
FIG. 7 illustrates the CONTEXT-TO-USER-SPACE protocol.

FIG. 7 illustrates the CONTEXT-TO-USER-SPACE protocol. CONTEXT-TO-USER-SPACE addresses the problem that occurs when disconnections cannot be avoided and must occur during useful parallel work. As previously mentioned, no work beyond the parallel region can be started until all work in the parallel region is complete. This assures program correctness. Disconnecting a process in the middle of parallel work causes all other processes to wait until the disconnected process has been rescheduled and has completed its portion of work. CONTEXT-TO-USER-SPACE is a protocol that allows the Multiprocessing Library 12 to schedule a disconnected task to another process that is connected and looking for work.

While a process is executing in the Multiprocessing Library 12 and is in the process of having a task scheduled to it, the context save flag 61 is set to "save-in-system-space." In this state, if a process is interrupted, the registers for that process are saved in system space. User programs can not access this portion of memory.

As soon as the Multiprocessing Library 12 has scheduled a task to a process but before allowing the process to execute the task, the Multiprocessing Library 12 sets the context save flag 61 to "save-in-user-space". This setting indicates to the Operating System 51 that the process is currently executing in a parallel region. When the Operating System 51 interrupts a process with its context save flag set to save-in-user-space, it saves the user registers into the task's context structure 71 that is currently connected to that process. The Operating System 51 then sets an indicator flag in the context structure to signify to the Multiprocessing Library 12 that this task was interrupted during a parallel region. This allows the Multiprocessing Library 12 to schedule this interrupted task to the next available process.

Immediately upon completing a task and returning to the library, the save flag is set to save-in-system-space. Once a process determines that there are no schedulable tasks, it sets the save flag to don't-save-at-all and spins in the slave hold loop. The only time that the save flag is set to don't-save-at-all is when a process is spinning in the hold loop or doing other work in portions of the library where it would be faster for another process to just start over again with the work in progress rather that saving and restoring the context of the interrupted process. More specifically, if a process is in the hold loop waiting for a task to become schedulable, there is no reason to save its registers if it is interrupted. Its registers are not holding anything important so there is no need to go through the work and delay of saving and restoring them. The don't-save-at-all flag indicates that no context need be saved. Instead, when the Operating System disconnects the process, the program counter register is set to begin executing in the Multiprocessing library, the rest of the exchange package is zeroed, and the process is placed at the bottom of the run queue. When the process is finally scheduled again by the Operating System, it will begin executing in the Multiprocessing Library.

Thus, the present invention provides methods for facilitating the efficient use of a multiprocessing system, providing efficient distribution and execution of parallel tasks in parallelized processes.

What is claimed is:

1. In a multiprocessor system, a method for delaying Operating System interruptions of a process performing a thread of tasks until the current task is complete or the expiration of a time slice, comprising the steps of:
    (a) the Operating System setting a GIVEUP flag in a data buffer area associated with the process to inform a multiprocessing scheduling program that the process is to be interrupted after the process is determined that it is performing said task;
    (b) upon completion of said task the multiprocessing scheduling program reading the GIVEUP flag and returning the CPU to the Operating System if the GIVEUP flag is set; and
    (c) the Operating System interrupting the process at the end of a time slice, if the process has not yet finished said task and returned the CPU back to the Operating System.

2. In a multiprocessor system, a method for assigning parallel tasks from interrupted processes to available processes, comprising the steps of:
    (a) a slave process setting a save-in-user-space flag to inform the Operating System that the slave process is currently performing a parallel task;
    (b) if the slave process is interrupted, the Operating System saving the context of the slave process in user-space;
    (c) the Operating System setting a flag to inform a multiprocessing scheduling program that the process was interrupted while performing a parallel task;
    (d) checking of the flag by the multiprocessing scheduling program to detect the interrupted task; and
    (e) assigning the interrupted task to an available process started by the Operating System.

3. The method according to claim 1 further wherein a process checks its associated GIVEUP flag after it completes its assigned task.

4. The method according to claim 2 further wherein the step of assigning a given process a task includes setting a save-in-system-space flag to inform the Operating System to save the context of the given process in system space if the process is interrupted because the process is not currently performing a parallel task.

5. The method according to claim 1 further wherein each slave process has a thread structure associated with it and further comprising the step of the Operating System checking to see if a process it wants to interrupt has a thread structure associated with it and, if it does, setting the GIVEUP flag for the process after checking the process to determine that the process is performing said task, and, if it is not performing said task, interrupting the process.

6. The method according to claim 1 wherein said method further comprises the steps of:
    (d) the process setting a context save flag to "save-in-user-space" if the process is assigned a parallel task; and
    (e) the Operating System, if it interrupts the process, checking the context save flag and saving the context of the interrupted process in user space if the flag is set to "save-in-user-space" so that the context may be retrieved by another process.

7. The method according to claim 6 further comprising the steps of:
    (f) the process setting the context save flag to "don't-save-at-all" if the process has no context worth saving; and
    (g) the Operating System not saving the context of the interrupted process if the context save flag is set to don't-save-at-all.

8. The method according to claim 2 further wherein an interrupted process is rescheduled on a priority basis.

9. The method according to claim 2 further comprising the step of the first available process retrieving the context of the interrupted given task from user space and using the context to continue executing the task.

10. In a multiprocessor system having an Operating System, a method for parallel processing of parallel regions of code, comprising the steps of:
    (a) establishing a master process and one or more slave processes;
    (b) establishing a data buffer conduit including a thread structure and a context structure for each said slave process, each said thread structure including a WAKEUP flag and a GIVEUP flag;
    (c) the master process setting the WAKEUP flag for a slave process when a parallel region of code is encountered;
    (d) the Operating System polling said WAKEUP flags and, upon detection of a WAKEUP flag for a slave process, activating a slave process and the slave process obtaining a task to execute;
    (e) the Operating System setting the GIVEUP flag for the running slave process if the Operating System desires to interrupt the process;
    (f) the running slave process polling the GIVEUP flag at the completion of its task and returning control to the Operating System if the GIVEUP flag is set; and
    (g) the Operating System interrupting the slave process for which it has set the GIVEUP flag if the slave process does not return control to the Operating System within a predetermined time slice.

11. The method according to claim 10 further wherein the thread structure includes a context save flag, and wherein said method further comprises the steps of:
  (h) the slave process setting the context save flag to "save-in-user-space" if the slave process is currently performing parallel work; and
  (i) the Operating System checking the context save flag if it interrupts a slave process and saving the context of the interrupted process in user space in the context structure if the flag is set so that the context may be retrieved by another process.

12. The method according to claim 10 further wherein the thread structure includes a context save flag, and wherein said method further comprising the steps of:
  (h) the slave process setting the context save flag to "save-in-system-space" if the slave process is not currently performing parallel work; and
  (i) the Operating System saving the context of the interrupted slave process in system space if the context save flag is set to save-in-system-space.

13. The method according to claim 10 further wherein the thread structure includes a context save flag, and wherein said method further comprising the steps of:
  (h) the slave process setting the context save flag to "don't save-at-all" if the process has no context worth saving; and
  (i) the Operating System not saving the context of the interrupted slave process if the context slave flag is set to don't-save-at-all.

14. A method according to claim 2 further wherein the next available slave process executes said multiprocessing scheduling program as called for in step (d).

* * * * *